Patented Jan. 12, 1954

2,666,070

UNITED STATES PATENT OFFICE 2,666,070

11α-HYDROXYPROGESTERONE AND ESTERS THEREOF

Herbert C. Murray and Durey H. Peterson, Kalamazoo, Mich., assignors to The Upjohn Company, Kalamazoo, Mich., a corporation of Michigan No Drawing. Application February 19, 1952, Serial No. 272,505

7 Claims. (Cl. 260—397.4)

This invention relates to a new compound, 11α-hydroxyprogesterone and esters thereof.

The novel 11α-hydroxyprogesterone of the present invention is a valuable pharmaceutical, being both anti-estrogenic and anti-androgenic and exhibiting uterine atrophying activity. The compound is effective in the treatment of serum vascular disease as demonstrated in rabbits. Moreover the product of the present invention does not exhibit undesirable side effects as does 11β-hydroxyprogesterone such as, for example, catabolic effects and anesthesia, progestational, glucocorticoid and androgenic activity and adverse effects on pregnancy as evidenced in rats.

Additionally, the esters have pharmacological and especially progestational and anti-estrogenic activity and are useful in the synthesis of other 11-oxygenated steroids such as cortisone.

The art is apprised of 11β-hydroxyprogesterone, Shoppee and Reichstein, Helv. Chim. Acta, 24, 351–60 (1941); Reichstein and Fuchs, ibid., 26 684 (1943), melting at 182 to 188 degrees centigrade and with an $[\alpha]_D^{12}$ of plus 222.5±4 degrees (1.748 in acetone). The novel compound of the present invention is distinguished therefrom in physical, chemical and physiological properties. The new compound, 11α-hydroxyprogesterone, melts at 166 to 168 degrees centigrade and has an $[\alpha]_D^{24}$ of plus 180 degrees and a $k_{242}$ of 46.72. 11α - hydroxyprogesterone and 11β - hydroxyprogesterone have specifically different infrared absorption spectra. The 11α-hydroxyprogesterone is thermally stable and resistant to attack by acids whereas 11β-hydroxyprogesterone is unstable; 11α-hydroxyprogesterone can be protected from oxidation whereas 11β-hydroxyprogesterone is unprotectable.

It is an object of the present invention to provide the novel 11α-hydroxyprogesterone and esters thereof. Other objects will be apparent to those skilled in the art to which this invention pertains.

The following examples are illustrative of the processes and products of the present invention but are not to be construed as limiting.

Example 1.—11α-hydroxyprogesterone

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 32 to 48 hour growth of culture RH 176, Rhizopus arrhizus, grown at room temperature with aeration, was added one gram of progesterone in fifty milliliters of acetone. The culture was then incubated at room temperature for 48 hours. At the end of this time, the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of a two percent aqueous sodium bicarbonate solution and three 500-milliliter portions of distilled water. The methylene chloride extract was evaporated to dryness in vacuo and the solid residue taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly to room temperature. Seventy-five milligrams of crystals, melting at 246 to 249 degrees centigrade, separated from the mother liquor.

The mother liquor from the above crystallization was freed of solvent by aeration and the solid residue weighing 1.5 grams was dissolved in fifty milliliters of benzene, and chromatographed over alumina ($Al_2O_3$) as shown in Table I. Fifty grams of acid-washed alumina, dried at 45 degrees centigrade, was used as adsorbent and 100-milliliter portions of solvents were used to develop the column (see Table I).

TABLE I $Al_2O_3$ chromatography of biologically converted progesterone using organism RH 176 (Rhizopus arrhizus

| Fraction Number | Solvent | Eluate Solids, Milligrams |
|---|---|---|
| 1 | benzene | 0 |
| 2 | do | 182.2 |
| 3 | benzene plus 5 percent ether | 123.0 |
| 4 | do | 246.6 |
| 5 | benzene plus 10 percent ether | 162.9 |
| 6 | do | 18.0 |
| 7 | do | 11.2 |
| 8 | benzene plus 50 percent ether | 128.2 |
| 9 | do | 33.6 |
| 10 | ether | 16.1 |
| 11 | do | 15.4 |
| 12 | ether plus 5 percent chloroform | 3.8 |
| 13 | do | 2.0 |
| 14 | ether plus 10 percent chloroform | 3.4 |
| 15 | do | 3.6 |
| 16 | ether plus 50 percent chloroform | 3.5 |
| 17 | do | 2.1 |
| 18 | chloroform | 2.5 |
| 19 | do | 222.6 |
| 20 | chloroform plus 5 percent acetone | 167.9 |
| 21 | do | 23.5 |
| 22 | chloroform plus 10 percent acetone | 17.3 |
| 23 | do | 8.7 |
| 24 | chloroform plus 50 percent acetone | 30.9 |
| 25 | do | 6.1 |
| 26 | acetone | 13.0 |
| 27 | do | 8.4 |
| 28 | acetone plus 5 percent methanol | 25.0 |
| 29 | do | 4.6 |
| 30 | acetone plus 10 percent methanol | 7.4 |
| 31 | do | 1.4 |
| 32 | acetone plus 50 percent methanol | 8.1 |
| 33 | do | 5.3 |

Combined eluate solids fractions 19 and 20 were dissolved in two milliliters of hot methanol and filtered. After overnight refrigeration, 171 milligrams of crystalline product, melting at 166 to 167 degrees centigrade, was obtained. Recrystallization from three milliliters of methanol produced 98.7 milligrams of 11α-hydroxyprogesterone, melting at 166 to 167 degrees centigrade and having an $[\alpha]_D^{20}$ of plus 175.9 degrees (1.0127 in chloroform).

Analysis: Calculated for $C_{21}H_{30}O_3$: C, 76.40; H, 9.10. Found: C, 76.66; H, 8.92. Infrared studies verified the presence of one hydroxy group in addition to the basic progesterone molecule.

The position of the hydroxy group was established in the eleven position by oxidation of a thirty milligram sample of 11α-hydroxyprogesterone in 0.5 milliliter of glacial acetic acid using one milliliter of glacial acetic acid containing five milligrams of chromic oxide in five microliters of water and allowing the mixture to stand at room temperature for one hour. A few drops of methanol were then added, and, after ten minutes, the methanol was diluted to 45 milliliters with water, the solution extracted with three fifteen-milliliter portions of methylene chloride, and the methylene chloride then evaporated. The residue was recrystallized from 0.5 milliliter of methanol to yield nineteen milligrams of 11-ketoprogesterone, melting at 172 to 175 degrees centigrade and with an $[\alpha]_D^{25}$ of plus 227 degrees (chloroform). The triketone structure was verified by infrared analysis.

A comparison of the physical constants indicated that the triketone was identical to the known 11-ketoprogesterone, melting at 172 to 175 degrees centigrade; $[\alpha]_D^{25}$ of plus 238 degrees plus or minus eight degrees (0.9 in acetone). Infrared analysis, X-ray diffraction, paper chromatography and optical rotation all showed that the compound was identical to an authentic sample of 11-ketoprogesterone. Reichstein, Helv. Chim. Acta, 23, 684 (1940); ibid. 26, 721 (1942).

*Example 2.—11α-hydroxyprogesterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with *Rhizopus nigricans* minus strain, American type culture collection number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added six grams of progesterone in 150 milliliters of acetone to provide a suspension of the steroid in the culture. After an additional 24 hour period of incubation under the same conditions of temperature and aeration, the beer and mycelium were extracted and concentrated. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvent then evaporated. The resulting crude crystals were dried and then washed five times with five milliliter portions of ether per gram of crude crystals, yielding 5.072 grams of crystals melting at 165 to 168 degrees centigrade. Recrystallization of 400 milligrams of these crystals from methanol gave 311 milligrams of 11α-hydroxyprogesterone with a melting point of 166 to 168 degrees centigrade, an $[\alpha]_D^{24}$ of plus 180 degrees (1.0127 in chloroform) and a $k_{242}$ of 46.72.

Analysis: Calculated for $C_{21}H_{30}O_3$: C, 76.40; H, 9.10. Found: C, 76.77; H, 8.92.

*Example 3.—11α-acetoxyprogesterone*

Twenty milligrams of 11α-hydroxyprogesterone was mixed with 0.6 milliliter of pyridine and 0.6 milliliter of acetic anhydride. After sixteen hours at room temperature, 25 milliliters of water was added. After one hour, the preparation was refrigerated to cause crystallization. The crystals which formed were washed with water and dried to yield 16.1 milligrams of 11α-acetoxyprogesterone having a melting point of 175 to 177 degrees centigrade, $[\alpha]_D^{24}$ of 143 degrees in acetone and plus 158 degrees in chloroform, extinction coefficient $\lambda 241$ in alcohol of 43.44, $E=16,175$. Infrared analysis indicated the absence of the hydroxyl group and the presence of a new acetoxy group.

Anaylsis: Calculated for acetoxyprogesterone: C, 74.0; H, 8.85. Found: C, 74.33; H, 8.78.

*Example 4.—11α-formyloxyprogesterone*

A solution of five grams of 11α-hydroxyprogesterone in 100 milliliters of 87 percent formic acid was heated to 75 degrees centigrade for ninety minutes. The solution was then cooled to 25 degrees centigrade and 140 milliliters of water was added to initiate crystallization. An additional 35 milliliters of water was then added and the mixture placed in the refrigerator. The yield was 3.29 grams (58 percent yield) of crystals melting at 154 to 158 degrees centigrade. The mother liquor was diluted with water to about 400 milliliters and allowed to stand for two days under refrigeration at a temperature of four degrees centigrade, to give a second crop of crystals weighing 0.63 gram (eleven percent yield) melting at 152 to 155 degrees centigrade. The two crops were combined and recrystallized from 39 milliliters of methanol yielding crystals of 11α-formyloxyprogesterone melting at 157 to 159 degrees centigrade, $[\alpha]_D^{23}$ of plus 177 degrees (0.752 gram in 100 milliliters of chloroform).

*Example 5.—11α-formyloxyprogesterone*

One gram of 11α-hydroxyprogesterone in twenty milliliters of 87 percent formic acid was heated for two hours at 75 degrees centigrade. Upon incorporating 200 milliliters of water, there precipitated 0.92 gram of crystals melting at 152 to 154 degrees centigrade. Two recrystallizations from forty-milliliter portions of 45 percent formic acid gave 0.64 gram (56 percent yield) of 11α-formyloxyprogesterone melting at 158.5 to 161.5 degrees centigrade.

*Example 6.—11α-propionyloxyprogesterone*

A mixture of 6.70 grams of 11α-hydroxyprogesterone, thirty milliliters of propionic anhydride and thirty milliliters of pyridine was stoppered and maintained at room temperature for about 18 to 20 hours. The solution was then poured into five hundred milliliters of ice water, whereupon a colorless gum formed and soon crystallized. After hydrolysis of the excess propionic anhydride had occurred, the crystalline solid, 11α-propionyloxyprogesterone, was collected, washed thoroughly with water, dried first in air and then in a vacuum desiccator over calcium chloride. The yield of 7.60 grams was 97.5 percent of the theoretical yield. The 11α-propionyloxyprogesterone had a melting point of 145.5 to 146 degrees centigrade (uncorrected) and an optical rotation $[\alpha]_D^{25}$ of plus 156 degrees (1.253 grams in chloroform).

Analysis: Calculated for $C_{24}H_{34}O_4$: C, 74.58; H, 8.87. Found: C, 74.84; H, 8.74; C, 74.81; H, 8.64.

*Example 7.—11α-benzoxyprogesterone*

11α-hydroxyprogesterone (0.5 gram) was dissolved in six milliliters of hot benzene and cooled to room temperature. Then 0.4 milliliter of freshly dried and redistilled pyridine and 0.4 milliliter of freshly-distilled benzoyl chloride were added and the mixture allowed to stand at room temperature for twenty hours. The reaction mixture was diluted with fifty milliliters of ether, washed successively with water, ten percent sodium hydroxide solution, and water, dried over sodium sulfate and the solvent evaporated on a hot water bath, the terminal evaporation being facilitated by vacuum. The residue was heated with 25 milliliters of water under reflux for fifteen minutes, cooled, extracted with ether, washed with water, ten percent sodium hydroxide solution, and again with water, dried and evaporated to a volume of ten milliliters. Crystals formed during this evaporation. After cooling, the crystals were removed by filtration and washed with about five milliliters of hexane. The yield was 0.44 gram (68 percent of the theoretical) of 11α-benzoxyprogesterone melting at 179 to 181 degrees centigrade. Recrystallization from twenty milliliters of ether concentrated on a steam bath to ten milliliters gave a product melting at 181 to 183 degrees centigrade; $[\alpha]_D^{23}$ of plus 88 degrees (1.686 grams in chloroform).

Analysis: Calculated for $C_{28}H_{34}O_4$: C, 77.38; H, 7.89. Found: C, 77.50; H, 7.88; C, 77.64; H, 8.01.

The 11α-hydroxyprogesterone can be converted into the corresponding 11α-acyloxy derivatives as indicated in Example 3, according to known acylation procedures, as by reaction with ketene, ketenes or an appropriate acid, acid anhydride or acyl halide, in an organic solvent such as pyridine or the like. Representative esters of 11α-hydroxyprogesterone thus-prepared include one to eight carbon atom carboxylic acid acyloxy esters of saturated or unsaturated aliphatic or cycloaliphatic, aryl, alkaryl, aralkyl, mono, di or polycarboxylic acids, formyloxy, acetoxy, propionyloxy, butyryloxy, valeryloxy, hexanoyloxy, heptanoyloxy, octanoyloxy, benzoxy, phenylacetoxy, toluoyloxy, cyclopentanoyloxy, cyclopentylpropionyloxy, acrylyloxy, cyclohexanoyloxy, the half and di esters of the 11α-hydroxyprogesterone with malonic, maleic, succinic, glutaric and adipic acids, and the like. The acyl groups may also contain non-interfering substituents, such as mono or poly, halo, chloro, bromo, hydroxy, methoxy or the like if desired.

This application is a continuation-in-part of the applications of Murray and Peterson, Serial Number 180,496, filed August 19, 1950, now abandoned, and Serial Number 264,640, filed January 2, 1952.

We claim:
1. 11α-hydroxyprogesterone.
2. A compound represented by the graphical formula:

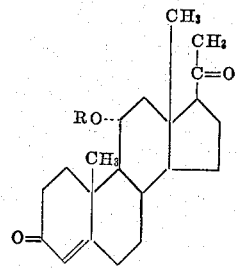

wherein R is selected from the radicals consisting of hydrogen and hydrocarbon-carboxylic acyl radical containing from one to eight carbon atoms, inclusively.

3. 11α-acyloxyprogesterone wherein the acyloxy group is of the formula AcO, Ac being the acyl radical of a hydrocarbon-carboxylic acid containing from one to eight carbon atoms, inclusively.

4. 11α-acetoxyprogesterone.
5. 11α-propionyloxyprogesterone.
6. 11α-benzoxyprogesterone.
7. The acid succinate of 11α-hydroxyprogesterone.

HERBERT C. MURRAY.
DUREY H. PETERSON.

References Cited in the file of this patent
Reichstein, Helv. Chim. Acta 23, 684-8 (1940).